United States Patent [19]

Toyooka

[11] 4,050,739
[45] Sept. 27, 1977

[54] UNLOADING APPARATUS OF TRUCK

[76] Inventor: Terumasa Toyooka, 1-734, Sakae, Ikeda, Osaka, Japan

[21] Appl. No.: 607,387

[22] Filed: Aug. 25, 1975

Related U.S. Application Data

[63] Continuation of Ser. No. 419,207, Nov. 26, 1973, abandoned.

[51] Int. Cl.² ............................................. B60P 1/04
[52] U.S. Cl. ................................. 298/19 V; 214/514; 280/80 B; 298/21 V
[58] Field of Search ..................... 214/506, 512, 514; 280/80 B, 43.17, 43.23; 180/70 R, 70 P, 71, 24.02; 298/1 B, 17.5, 22 F, 22 D, 19 V, 21 V, 5, 175 G; 267/56

[56] References Cited

U.S. PATENT DOCUMENTS

| | | | |
|---|---|---|---|
| 1,822,623 | 9/1931 | Hill | 180/70 R |
| 2,471,379 | 5/1949 | Smith | 298/19 V |
| 2,494,945 | 1/1950 | Huntington | 180/71 |
| 3,032,133 | 5/1962 | Brown | 180/71 X |
| 3,486,763 | 12/1969 | Hexel | 180/71 X |
| 3,833,263 | 9/1974 | Jackson | 298/17.5 X |

FOREIGN PATENT DOCUMENTS

| | | | |
|---|---|---|---|
| 602,171 | 7/1960 | Canada | 298/5 |
| 1,285,163 | 1/1962 | France | 180/70 R |

Primary Examiner—Robert J. Spar
Assistant Examiner—Donald W. Underwood
Attorney, Agent, or Firm—Otto John Munz

[57] ABSTRACT

Apparatus for facilitating the loading and unloading of a motor truck. The rear spring suspension of the truck is fixed to and adjacent the rear ends of a pair of right and left flexible cantilever beams attached at their forward ends to the respective sides of the chassis or frame. The rear driving axle of the truck is connected with the transmission through a splined shaft variable in effective length. In normal driving the rear spring suspension is over the axle for direct support thereby. But when loading or unloading, the front wheels may be braked or blocked so that power operation of the rear wheels propels the axle forwardly and guidedly along the beams whereby the beams flex and allow the rear end of the chassis to lower to any desired extent. In a dump type truck, forward propulsion of the axle as aforesaid also elevates the forward end of the hinged container to thus dump its contents.

4 Claims, 10 Drawing Figures

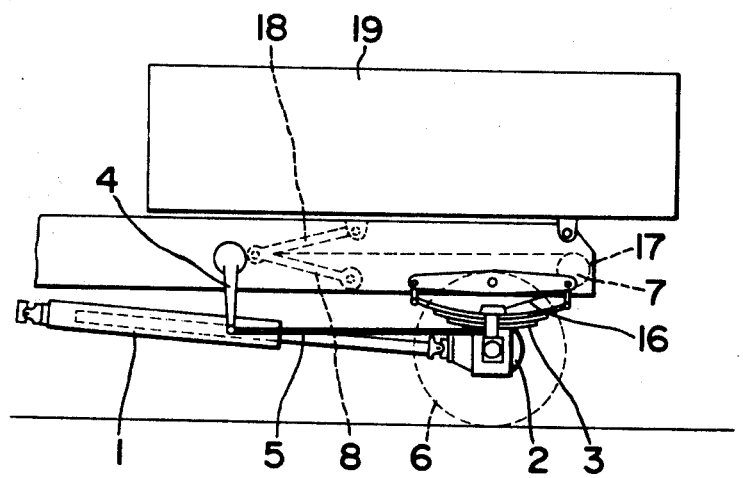
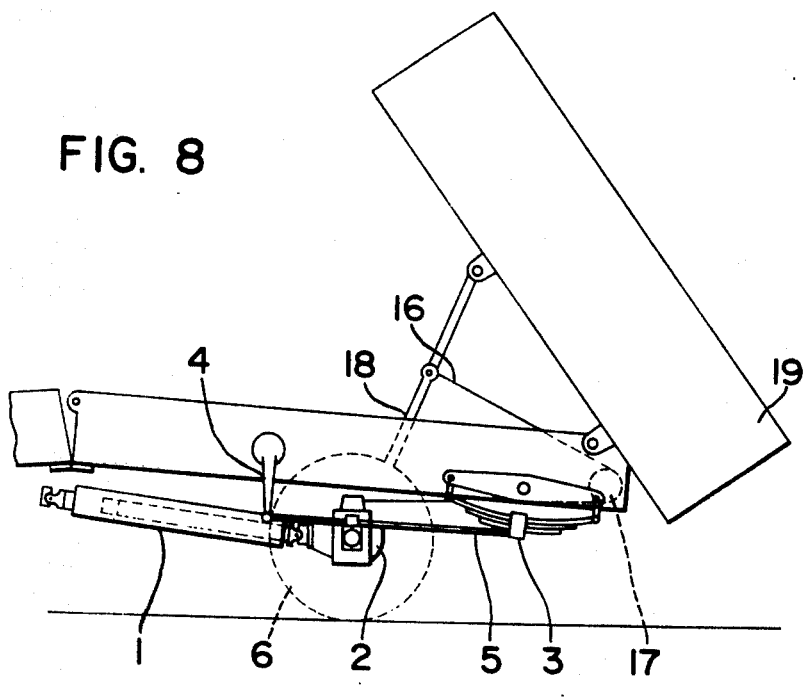

UNLOADING APPARATUS OF TRUCK

CROSS REFERENCE TO RELATED APPLICATION

This application is a continuation of application Ser. No. 419,207, filed Nov. 26, 1973, now abandoned.

FIELD OF THE INVENTION

This invention relates to an apparatus for unloading the goods loaded on a motor truck or the like without using a crane, a hydraulic lifting apparatus, etc. and more particularly to an unloading apparatus of a truck which unloads the goods by advancing only rear wheels by means of a drive shaft of a motor truck or the like and lowering a rear end of an under frame using the weight of the loaded goods.

DESCRIPTION OF THE PRIOR ART

When a conventional motor truck for transporting goods, a container or the like is unloaded at a destination, a lifting apparatus such as a crane for lifting and lowering the cargo is required. When unloading a dump truck for transporting bulk cargo, it is necessary that the body or load container of the truck in order to dump the cargo. Such unloading of the goods from a dump truck usually is carried out by a hydraulic tilting apparatus provided in the truck itself.

In case the load on a motor truck must be unloaded at a destination or accumulation place having no crane or similar equipment, it is necessary for the loads to be unloaded manually.

OBJECTS OF THE INVENTION AND DRAWINGS

Stated broadly, the present invention is directed to provide an unique, useful and efficient motor trucks and dump trucks provided with a novel, compact and simple mechanism or equipment, which trucks may be used at any place without lifting and lowering equipment.

It is accordingly a general object of this invention to provide an improved lifting and lowering apparatus to be equipped in a motor truck without using a hydraulic apparatus.

Another object of this invention is to provide a simple mechanism for dumping the bulk cargo in a dump truck without using a hydraulic mechanism for lifting the rear end of the body or load container of the dump truck.

The manner in which the foregoing and other objects are achieved will be better understood in view of the following detailed description and accompanying drawings wherein:

BRIEF DESCRIPTION OF THE DRAWING

FIG. 7 is a side elevation of a truck embodying a bulk material-carrying body or container pivoted on the chassis and having mechanism to automatically elevate or tilt the container to unloading or dumping position, by and in response to forward translation of the axle beneath the chassis and on and along the cantilever beams; and FIG. 8 is a view like FIG. 7 but showing the container tilted to unloading position as the rear axle has moved forwardly.

FIG. 11 is a detail cross section to an enlarged scale, taken in a plane about as indicated by line 11, FIG. 2.

SUMMARY OF THE INVENTION

According to the first characteristic of the present invention, a part of the apparatus is attached to a lower end of rear wheel suspension springs equipped at both sides of the rear portion of an under frame of a motor truck or the like, while another part is mounted on a rotatable bracket through a torsion bar spring. A suspension system supporting beams slidably mounted on a rear axle housing through a roller at top and bottom and both sides is attached to the bracket and a drive shaft constructed so as to be slidably expandable is driven with the engine. On the operation of the first embodiment of the unloading apparatus, the rear wheels are driven by the drive shaft and the rear axle housing and the rear wheels are advanced from a normal position, so that the rear axle housing and rear wheels slide on and along the supporting beams (see FIG. 2). Accordingly, the rear axle with the rear wheels are supported at intermediate portions of the beams and the beams are deflected downwards due to weight of the loaded goods to thus lower the rear end of the frame or chassis.

As another feature the forward translation of the rear axle on and along the cantilever beams is utilized in a dump type truck, either to bodily move a cargo container rearwardly relatively to the chassis, to effect tilting and unloading thereof, or a cargo container pivoted to the chassis, is automatically elevated to dumping position by such forward translation.

BRIEF DESCRIPTION OF THE PREFERRED EMBODIMENTS

Figure 1:
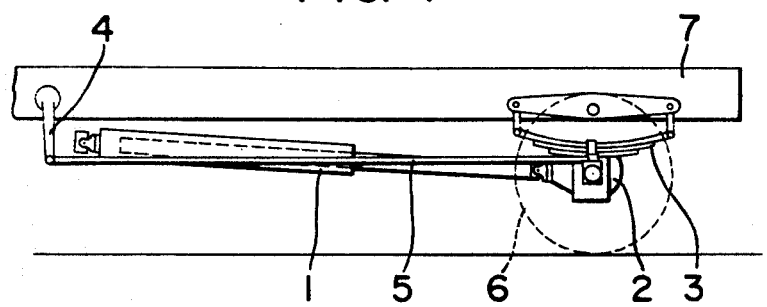
FIG. 1 is a side elevation of an embodment showing the position of the parts in normal driving wherein the rear end of the vehicle chassis is supported directly over the rear axle.
Figure 4:
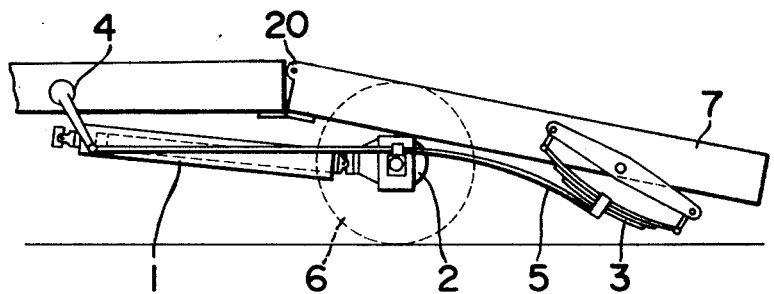
FIG. 4 is a side elevation of a modification wherein the chassis is in the form of two interpivoted sections, front and rear, with the pivot connection between them released to enable an increased angle of tilt of the rearward section.

In FIGS. 1 through 8, 1 designates a drive shaft constructed to be of variable over-all length by means of a spline joint connection. 2 is a rear axle housing, 3 a rear wheel suspending spring, 4 a bracket for supporting the suspension system, which is oscilatably or rotatably mounted on an outer frame 7 through a spring of a torsion bar spring or the like, 5 is suspension system supporting beams, one end of said suspension system supporting beams being mounted on a lower end of the rear wheel suspending spring 3a, the other end of the suspension system supporting beams being mounted on the bracket 4, thereby supporting the suspension system, and the suspension system supporting beams being slidably mounted on the rear axle housing 2 through a roller at top and bottom and both sides thereof. The reference numeral 6 is rear wheels and 7 an under frame. The under frame 7 may be divided in two and the front part of the frame supports the rear part of it by means of a securing pin 20 or the like as shown in FIG. 4 during running and when a rear end of the under frame 7 is lowered the pin 20 becomes a pivot which enables the rear end of the under frame 7 to incline downwardly when the pin is removed. Lower ends of the rear axle housing 2 and the rear wheel suspending spring 3 are secured to each other by a pin actuated by an electromagnetic device or an air cylinder or the like. As shown in FIG. 1, the load on the under frame is transmitted to the rear axle housing 2 through the rear wheel suspending spring 3 and finally to the rear wheel 6 as is well known in the art of motor truck.

Figure 2:
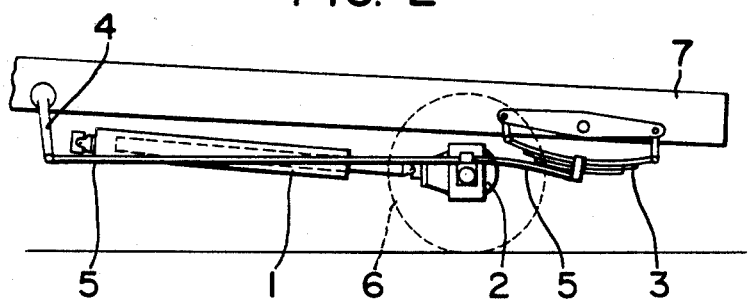
FIG. 2 is a view similar to FIG. 1 but showing an intermediate position of the parts wherein the rear wheels and axle have been translated forwardly with respect to the chassis and cantilever beams so that the latter in supporting the load at their rearward ends, have started to flex downwardly.
Figure 3:
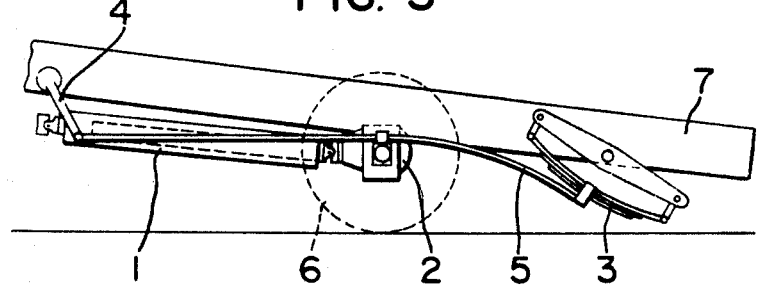
FIG. 3 is a view similar to FIG. 2 but showing the rear axle still further advanced thus effecting still greater flexure of the beams, and lowering the rear end of the chassis to essentially full unloading position.

To lower the rear end of a motor truck embodying the invention the front wheels are fixed by means of a brake and the pin securing lower ends of the rear axle housing 2 to the rear wheel suspending spring 3 is removed by actuating the electromagnetic device or the air cylinder and the drive shaft 1 is driven so as to slidably advance the rear axle housing 2 and the rear wheels along the suspension system supporting beams 5 from the normal position. As a result of this, load applied to the rear wheels 6 is not transmitted from the rear wheel suspending spring 3 immediately to the rear axle housing 2 but from the rear wheel suspending spring 3 to the rear axle housing 2 through the suspension system supporting beams 5. As shown in FIG. 2, the suspension system supporting beams 5 are supported on an upper edge of the rear axle housing 2 to support the loaded weight as cantilevers. Furthermore, when the rear axle housing 2 with the rear wheels 6 is advanced along the suspension system supporting beams 5, bracket 4 for supporting a suspension system rotates by proper amount according to hardness of its supporting spring and a supporting point of the rear axle housing 2 moves toward the front of the truck. When the supporting point moves a substantial distance forwardly along the beam 5, the beam or beams are bent downwardly to lower the rear end of the under frame 7. Downward flexure of the suspension system supporting beam 5 varies in accordance with its rigidity comprising the amount of the supporting point thereof and the loaded weight. Setting them at a proper values enables the rear end of the under frame 7 to be lowered until it almost contacts with the ground. In order to increase the angle of downward tilt of the rear part of the under frame, the rear part 7a is secured to the front part thereof by a pin 20 during running as shown in FIG. 4. When lowering the rear end, this pin may be removed enabling the rear end 7a of the under frame 7 to tilt downwardly. In case of returning the lowered under frame 7 to the original or horizontal position, the drive shaft 1, keeping the front wheels fixed, is driven in the opposite direction to that of the rear end lowering operation in order to retreat or return the rear axle housing 2 and the rear wheels 6 along the suspension system supporting beam 5 to the normal position. During the return operation of the rear axle housing 2 and the rear wheels 6, the moving amount of the supporting point of the suspension system supporting beam 5 towards the front gradually becomes small. The bracket 4 for supporting the suspension system supporting beam rotates or oscillates so as to return to the original position by means of force of a spring and the deflection of the suspension system supporting beam 5 becomes small gradually to raise the under frame 7 to the original horizontal position, lower ends of the rear axle housing 2 corresponds to the rear wheel suspending spring 3 in contacting position at the same level and then they are secured by means of a pin actuated by the electromagnetic device or the air cylinder to return to the condition in which the motor truck can run as shown in FIG. 1.

When advancing the rear axle housing 2 and the rear wheels 6 along the suspension system supporting beam 5 while rotating drive shaft 1, both wheels are driven through a differential gear so that the degrees of rotation of each may differ due to a possible difference of running resistance. This may tend to alter the angle of the rear axle housing with respect to the axis of the drive shaft 1.

Therefore, the supporting beams are constructed to have a cross section having proper strength along vertical direction and very great strength along horizontal direction like a section of a rectangular shape that is short vertically and long horizontally whereby the rear axle is prevented from angular movement in the horizontal plane with respect to the chassis. Each side of the rear axle housing 2, is attached to its supporting beams through anti-friction rollers, top and bottom and right and left sides thereof for each beam.

Figure 5:
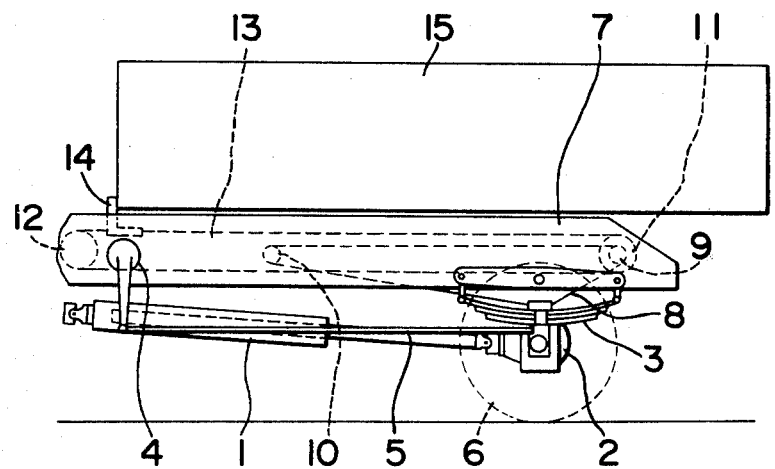
FIG. 5 is a side elevation of a truck equipped with the invention, wherein the chassis carries a discrete load support or container and is equipped with means to translate the container rearwardly, by an in response to forward translation of the rear axle as aforesaid.

Now, a first modification of the present invention will be explained with reference to FIG. 5 and FIG. 6, wherein 8 is a tension chain both ends of which are fixed to the rear axle housing 2 through small front and back sprockets 9 and 10, 9 being a small sprocket positioned at a rear end the under frame, and 10 being a small sprocket positioned in the front part of the under frame. 11 is a large sprocket positioned at the rear end, which large sprocket is coaxial with and fixed with the small sprocket 9. Therefore, the movement value of the tension or pull chain 8 is enlarged by the ratio determined by a ratio of diameters of the large and small sprockets. 12 is a large sprocket at the front. 13 is an endless chain for unloading the loaded goods such as containers and pressing around the large sprockets 11, 12. 14 is a lug for unloading the loaded goods mounted on the chain 13, is fixed to chain 13 and longitudinally movable therewith to engage the container. 15 is the loaded goods such as a container carried on a rear body of the motor truck. Referring to FIGS. 5 and 6 again, when the front wheels are fixed, the drive shaft 1 is rotated and the rear axle housing 2 and the rear wheels 6 are advanced along the suspension system supporting beam 5 from the normal position in order to lower the rear end of the under frame 7, the small sprocket 9 is driven because the tension chain 8 is pulled in accordance with the advance of the rear axle housing 2, whereby the large sprocket 11 attached coaxially to the small sprocket 9 and the unloading chain 13 are driven backwards and the lug for unloading the loaded container pushes the container 15 backwards.

Figure 6:
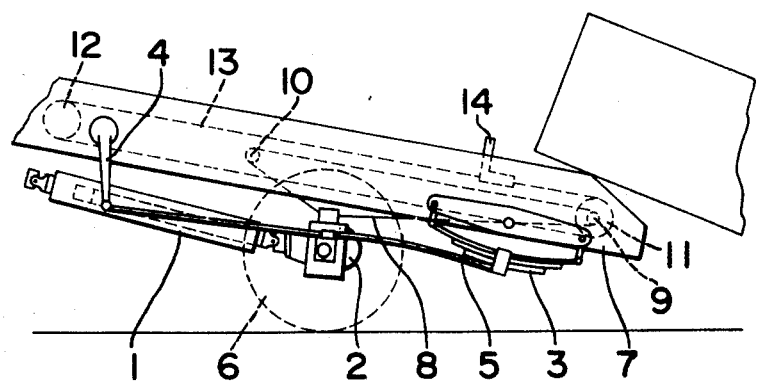
FIG. 6 is a view like FIG. 5 but showing the container about to be bodily displaced from the chassis.
Figure 10:
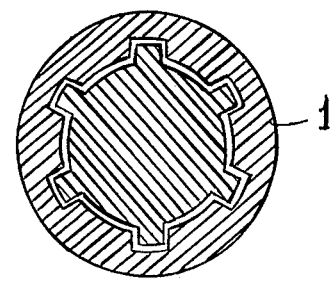
FIG. 10 is a detail cross section to an enlarged scale, taken in a plane about as indicated by line 10, FIG. 2.
Figure 9:
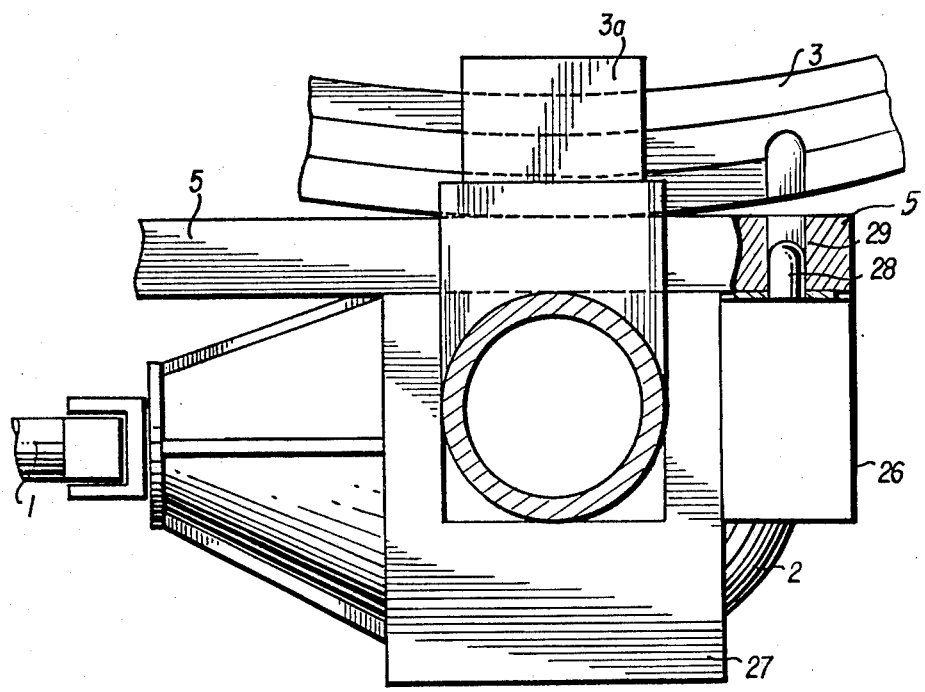
FIG. 9 is a detailed view to an enlarged scale showing the means by which the springs may be releasably locked to the rear axle or spring seats integrally connected therewith, during driving a normal operation of the vehicle.

As shown in FIG. 6, when the rear axle housing 2 and the rear wheels 6 are still further advanced and lowered until the rear end of under frame 7 is almost contact with the ground, the lug 14 for unloading the loaded goods pushes the container 15 toward the rear end of the under frame 7 so that the container can be slidably and manually lowered on the ground without using any lifting or lowering equipment.

After the unloading, the drive shaft is driven towards the direction opposite to that of unloading with the front wheels fixed by the brake of the motor truck and the rear axle housing 2 and the rear wheels 6 are retreated along the suspension system supporting beam 5 to the normal position, so that the rear end of the under frame is raised and returns to the normal horizontal position and the lug 14 for unloading the loaded goods moves towards the opposite direction and returns to the normal frontal position.

Now, the second embodiment of the present invention will be explained with reference to FIGS. 7 and 8. The second embodiment of the unloading apparatus is adapted to use for dumping bulk cargo from a dump truck. In FIGS. 7 and 8, 16 is a pull chain or wire. One end of the chain is secured to the rear axle housing 2 and the other end to a link work for dumping operation. 17 is a sprocket or roller for converting the pulling direction of the chain 16. 18 is a link work for raising the rear body 19 for dumping one of which link is pivoted to the under frame and the other end is pivoted to bottom portion of the rear body 19 in the neighborhood of a center of gravity of the rear body. To the intermediate portion of the link work is attached the pull chain.

During the dumping operation of the dump truck described with reference to FIG. 7 and 8, when the drive shaft 1 is driven fixing the front wheels so as to advance the rear axle housing 2 and the rear wheels 6 along the suspension system supporting beam 5 from the normal position, the pull chain 16 is pulled in accordance with the advance of the rear housing 2, whereby the intermediate portion of the link work 18 is pulled backward until the link device 18 pushes the rear body 19 up. As shown in FIG. 8, when the rear axle housing 2 and the rear wheels 6 are still more advanced, the link work 18 raises the rear body to its highest position and dumps the bulk cargo such as sands.

In case of the second embodiment, employed in a dump truck it is not so necessary to lower the rear end of the under frame 7. Since the suspension system supporting beam 5 functions to guide the advancing rear axle housing 2 preventing the rear axle housing 2 from bending, the section of the suspension system supporting beam may be shaped so as to have large strength along horizontal and vertical directions.

After unloading operation of the loaded goods is finished, the drive shaft 1 is driven fixing the front wheels towards the opposite or reverse direction and therefore the rear axle housing 2 and the rear wheels 6 are retreated along the suspension system supporting beam 5 to the normal position, so that the pull chain 16 is loosened and the link work 18 is folded by the weight of the rear body 19 to return to the original position.

What is claimed is:

1. In an unloading apparatus for an engine-driven truck having a chassis, a rear axle including laterally-spaced ground-engaging driving wheels, and an engine-driven shaft extending to and operatively connected with the rear axle and comprising two coaxial telescopically-connected forward and rearward sections, said unloading apparatus comprising, a pair of flexible, laterally-spaced, elongated beams, bracket means attaching each said beam at its forward end to a respective side of the chassis, forwardly of the rear axle, spring means connected between each said beam at its rearward end, respectively, and the chassis, and means connecting the axle at its respective ends, for sliding on and along said beams, from a first position wherein said axle directly supports the chassis, to a selected one of a plurality of second positions forwardly on and along said beams, by and in response to power operation of the rear wheels by the telescopic shaft, said beams flexing downwardly in response to movement of the axle to a selected one of said second positions, to thereby effect lowering of the rearward end of the chassis.

2. In a vehicle, a chassis, a drive shaft, a driving axle journaling ground-engaging wheels at its respective ends, a first resiliently flexible beam secured at its forward end to said chassis and extending rearwardly to and adjacent said axle, a first sliding connection between the axle and said first beam, to enable said axle to translate in the fore-and aft direction with respect to said chassis, spring support means attached to the rearward end of said first beam and to said chassis, for supporting the latter, said axle being translatable on and along said first beam, said drive shaft comprising forward and rearward aligned sections telescopically connected for conjoint rotation about common fore-and aft axis, and means carried by said axle and connected with the rearward end of the rearward section to rotate the ground-engaging wheels by and in response to rotation of said shaft.

3. The vehicle of claim 2, said first beam extending along one side of said chassis, a second resiliently flexible beam secured at its forward end to said chassis at the other side thereof, a second sliding connection between said axle and second beam, said support means comprising first and second springs attached to the ends of said first and second beams, respectively, and to said chassis to conjointly support the same.

4. The vehicle of claim 2, and a connection between said spring support means and said axle and effective to releasably fix together said first beam and said axle.

* * * * *